United States Patent
Wu et al.

(10) Patent No.: US 11,988,323 B2
(45) Date of Patent: May 21, 2024

(54) INSTALLATION BASE

(71) Applicant: Getac Technology Corporation, New Taipei (TW)

(72) Inventors: Ssu-Yuan Wu, Taipei (TW); Chun-Hsing Li, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 202 days.

(21) Appl. No.: 17/589,035

(22) Filed: Jan. 31, 2022

(65) Prior Publication Data
US 2022/0381395 A1    Dec. 1, 2022

Related U.S. Application Data

(60) Provisional application No. 63/194,352, filed on May 28, 2021.

(51) Int. Cl.
| | |
|---|---|
| *F16M 11/38* | (2006.01) |
| *A45F 5/02* | (2006.01) |
| *F16B 1/00* | (2006.01) |
| *F16M 13/04* | (2006.01) |

(52) U.S. Cl.
CPC ............... *F16M 11/38* (2013.01); *A45F 5/02* (2013.01); *F16B 1/00* (2013.01); *F16M 13/04* (2013.01); *A45F 2005/027* (2013.01); *F16B 2200/83* (2023.08)

(58) Field of Classification Search
CPC ........... F16M 11/38; F16M 13/04; A45F 5/02; A45F 2005/027; F16B 1/00; F16B 2200/83

USPC ........................................................ 248/274.1
See application file for complete search history.

(56) References Cited

U.S. PATENT DOCUMENTS

| | | | | |
|---|---|---|---|---|
| 5,927,579 | A * | 7/1999 | Schwabe ................ | A45F 5/02 396/420 |
| 8,317,067 | B2 * | 11/2012 | Lewis ..................... | A45F 5/02 224/183 |
| 10,063,271 | B1 * | 8/2018 | Goldshtein ........... | H04M 1/185 |
| 10,172,401 | B1 * | 1/2019 | Hopper .................. | A41F 1/002 |
| 10,327,538 | B2 * | 6/2019 | Alexander ............. | A45F 5/02 |
| 10,694,836 | B2 * | 6/2020 | Guzik .................... | A45F 5/02 |
| 11,497,299 | B2 * | 11/2022 | Vanman ................. | F16M 13/02 |
| 11,696,634 | B2 * | 7/2023 | Schori ................... | A45F 5/02 224/183 |

(Continued)

*Primary Examiner* — Monica E Millner
(74) *Attorney, Agent, or Firm* — Locke Lord LLP; Tim Tingkang Xia, Esq.

(57) ABSTRACT

An installation base includes a main body and a release member. The main body includes a first surface and a second surface on two opposite sides. The first surface is provided with a magnet piece. The release member is arranged on a second surface of the main body, and includes a pressing part, a pivoting part and an operating part. The pivoting part is pivotally connected to the main body in a first direction. The pressing part extends from the pivoting part in a second direction perpendicular to the first direction and protrudes from the main body, and a length of the pressing part in the second direction is greater than a thickness from the first surface to the second surface of the main body. The operating part extends from the pivoting part in the second direction toward a direction opposite to the pressing part.

20 Claims, 6 Drawing Sheets

(56) References Cited

U.S. PATENT DOCUMENTS

| | | | |
|---|---|---|---|
| 2010/0067833 A1* | 3/2010 | Jin | H04M 1/0237 384/8 |
| 2012/0207463 A1* | 8/2012 | Sherwood | F16M 13/04 396/428 |
| 2017/0119135 A1* | 5/2017 | Somoano | F16M 11/041 |
| 2018/0031014 A1* | 2/2018 | Bulat | F16B 2/08 |
| 2018/0325247 A1* | 11/2018 | Vlassis | F16M 11/041 |
| 2019/0198212 A1* | 6/2019 | Levy | F16M 11/2021 |
| 2020/0064715 A1* | 2/2020 | Wine | F16B 2/12 |
| 2020/0245730 A1* | 8/2020 | Grinnell | A44B 17/0076 |
| 2020/0337448 A1* | 10/2020 | Grinnell | G03B 17/561 |
| 2022/0045458 A1* | 2/2022 | Wu | F41C 33/006 |

* cited by examiner

INSTALLATION BASE

CROSS-REFERENCE TO RELATED APPLICATIONS

The application claims the benefit of a U.S. Provisional Patent Application No. 63/194,352, filed on May 28, 2021, the disclosure of which is hereby incorporated by reference herein in its entirety.

BACKGROUND OF THE INVENTION

Field of the Invention

The present invention relates to an installation base and, more particularly, to an installation base having a release member.

Description of the Prior Art

Installation bases are extensively applied in various commercial wearable products, for example, smart wearable devices, police secret recorders, bicycle lighting lamps and military equipment. A common installation base is usually attached to a user's body by a magnet. However, in order to allow a user to readily remove the installation base from the user, a magnet with a large force of attraction is scarcely used to avoid a situation that a user cannot smoothly remove the installation base. However, the installation base may not be effectively arranged on a user due to the insufficient force of attraction of the installation base.

SUMMARY OF THE INVENTION

In view of the above, an installation base provided according to an embodiment includes a main body and a release member. The main body includes a first surface and a second surface on two opposite sides. The first surface is provided with a magnet piece. The release member is arranged on a second surface of the main body. The release member includes a pressing part, a pivoting part and an operating part. The pivoting part is pivotally connected to the main body in a first direction. The pressing part extends from the pivoting part in a second direction and protrudes from the main body, and a length of the pressing part in the second direction is greater than a thickness from the first surface to the second surface of the main body. The second direction is perpendicular to the first direction, and the operating part extends from the pivoting part in the second direction toward a direction opposite to the pressing part.

In some embodiments, an end part of the pressing part is away from the pivoting part, and the end part is shaped as a rounded angle or a sharp angle.

In some embodiments, a portion from the pivoting part to the end part is defined as a first section, and a portion from the pivoting part to the operating part is defined as a second section, and a length of the second section is greater than or equal to a length of the first section.

In some embodiments, the main body further includes a fastening member arranged on the second surface of the main body.

In some embodiments, the release member is provided with an opening corresponding in position to the fastening member, and the fastening member of the main body is exposed from the opening.

In some embodiments, a carrier platform is further included. The carrier platform is attached to the first surface by the magnet piece.

In some embodiments, when the release member is pivotally turned, the pressing part presses against the carrier platform, such that a gap is produced between the main body and the carrier platform.

In some embodiments, when the release member is pivotally turned, an included angle is formed between the main body and the carrier platform.

In some embodiments, the magnet piece is arranged on two lateral sides of the first surface.

In some embodiments, the operating part has an accommodating portion.

In some embodiments, the main body has an accommodating chamber corresponding in position to the accommodating portion.

In conclusion, an installation base is provided according to an embodiment. When the carrier platform is attached to the first surface, the release member is pivotally turned to have the pressing part of the release member press against the carrier platform, such that a gap is produced between the carrier platform and the first surface, thereby reducing the force of attraction of the magnet piece upon the carrier platform and enabling a user to easily remove the installation base.

DETAILED DESCRIPTION OF THE EMBODIMENTS

Figure 1:
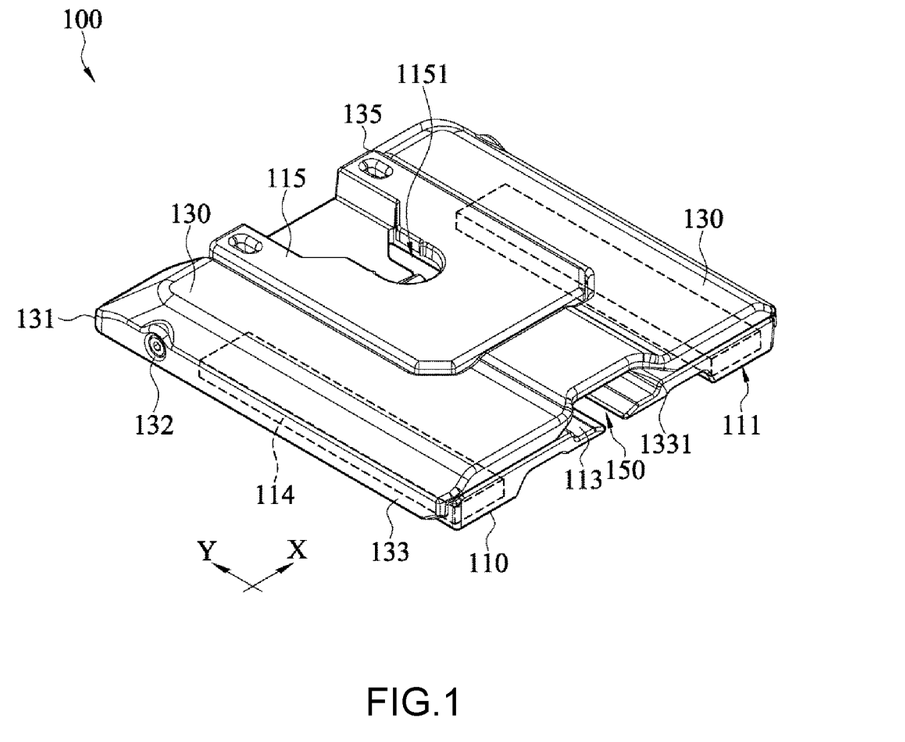
FIG. 1 is a three-dimensional schematic diagram of an installation base according to an embodiment.
Figure 2:
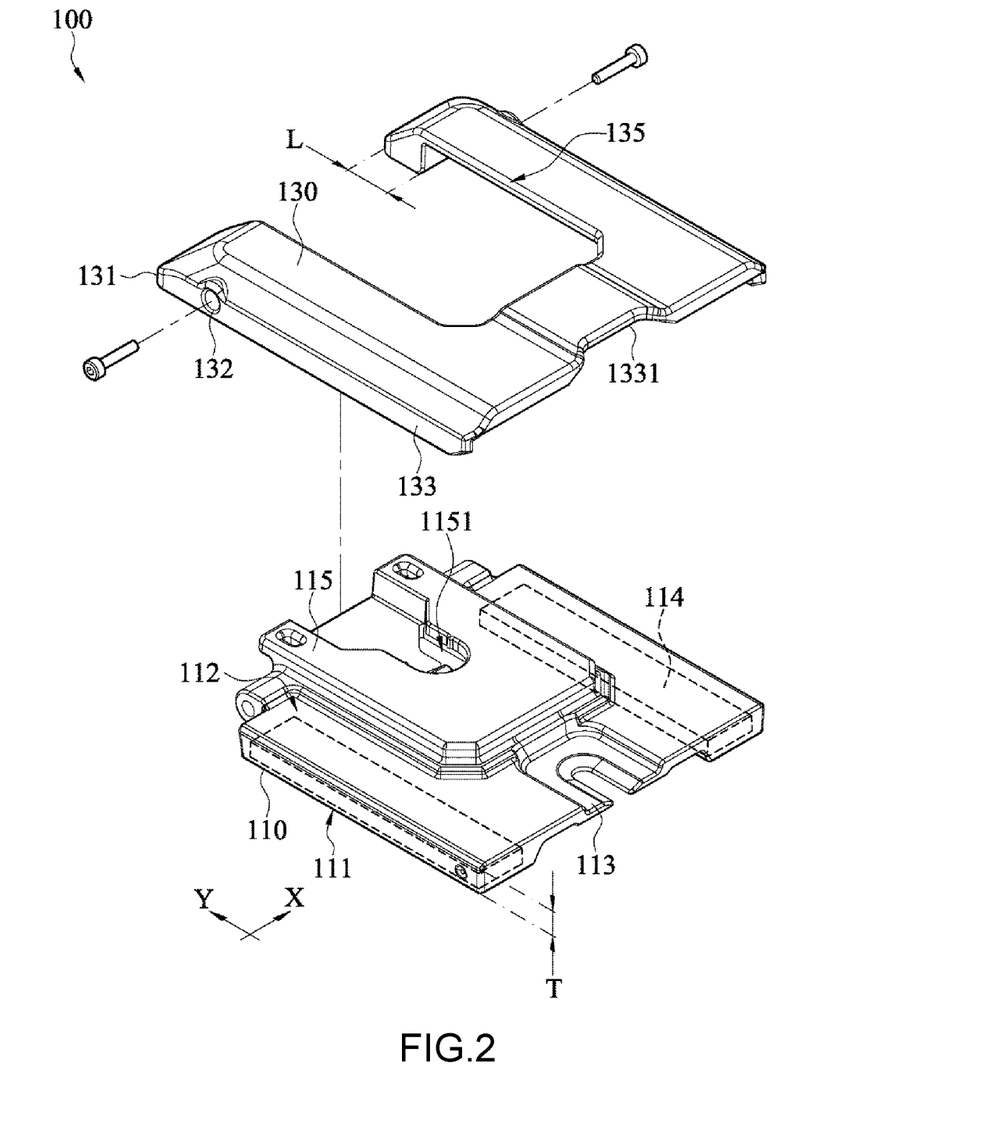
FIG. 2 is an exploded diagram of an installation base according to an embodiment.
Figure 3:
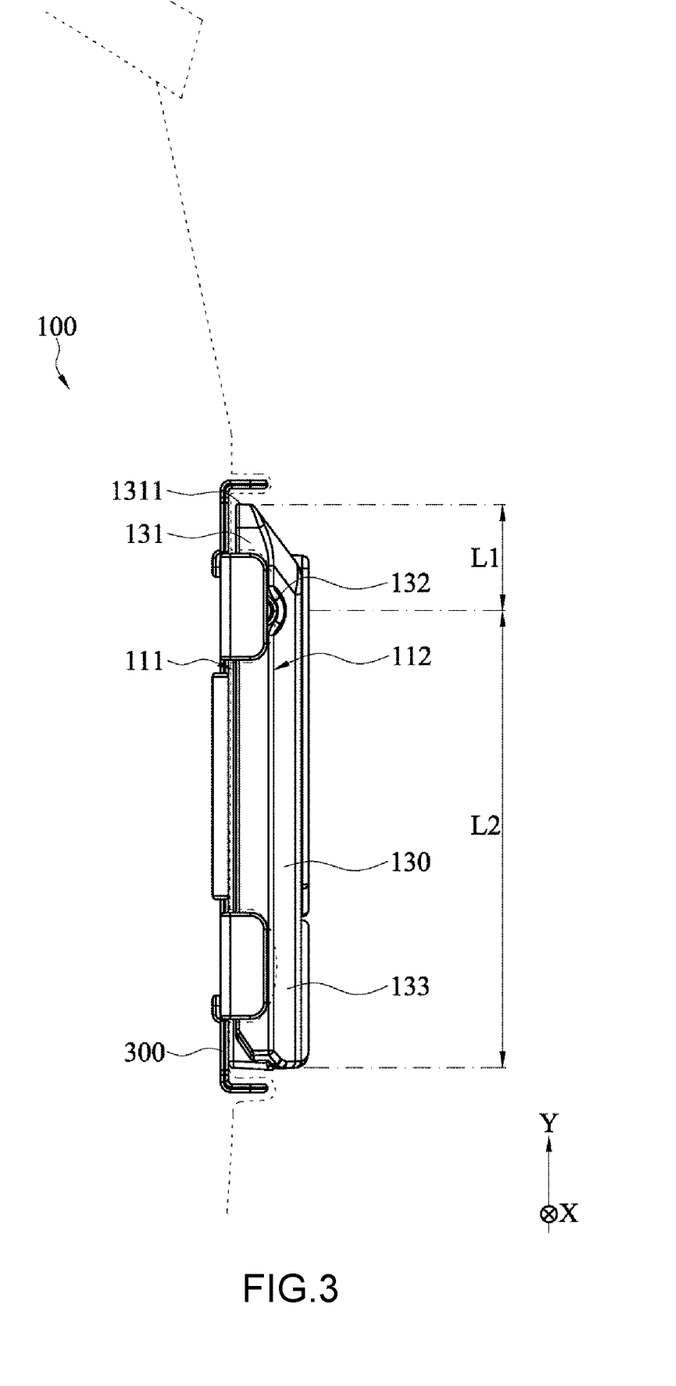
FIG. 3 is a schematic diagram of the left of an installation base according to an embodiment.
Figure 4:
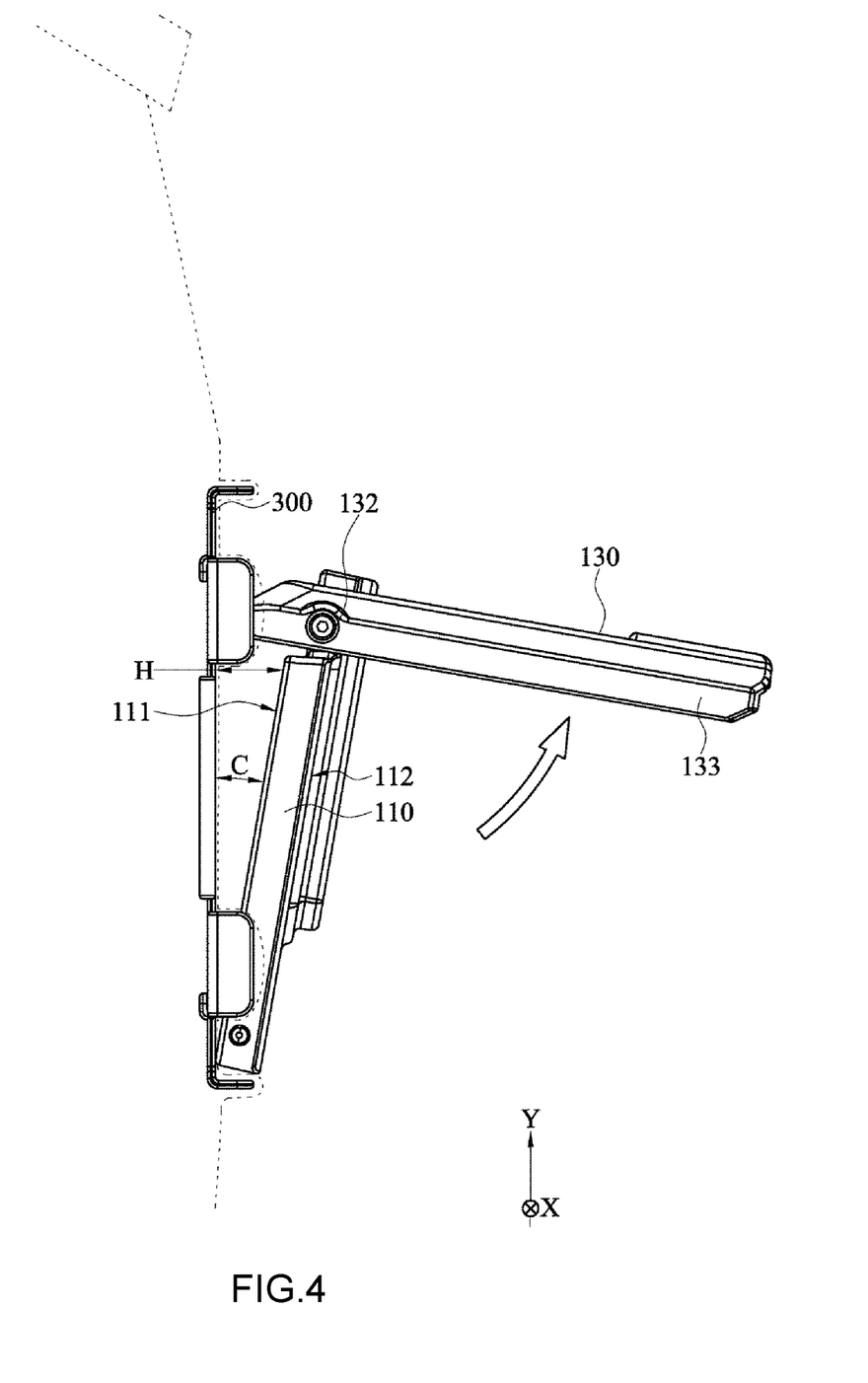
FIG. 4 is a schematic diagram of an operation of an installation base according to an embodiment.
Figure 5:
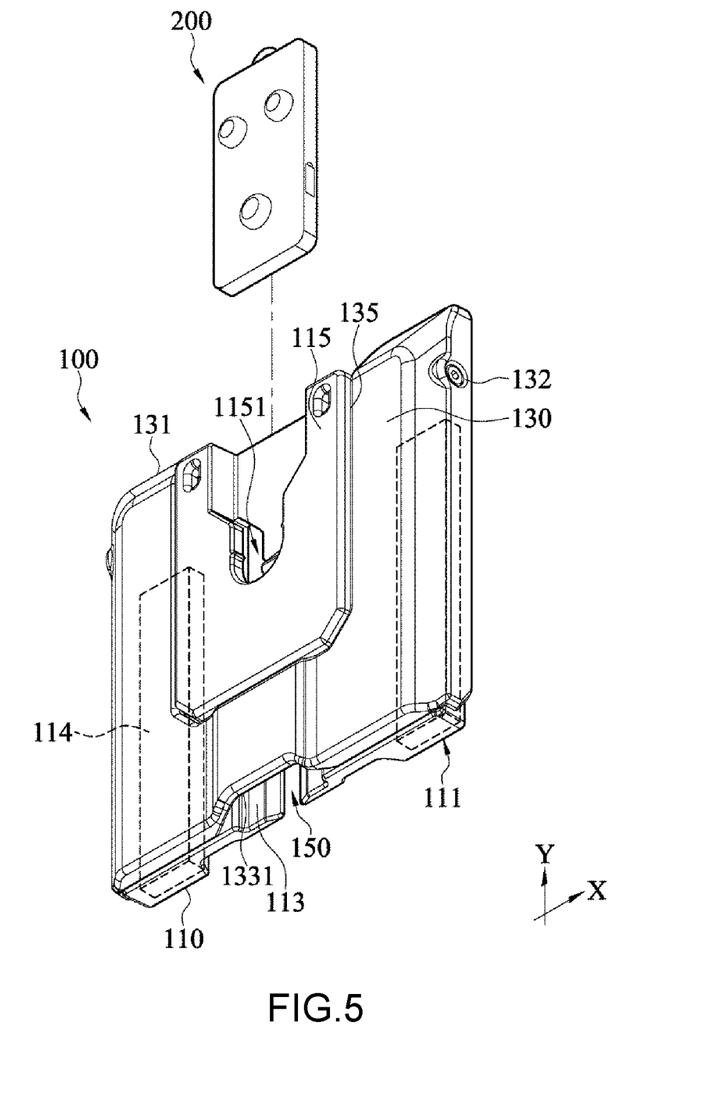
FIG. 5 is a schematic diagram of assembly of a wearable device according to an embodiment.

Refer to FIG. 1 to FIG. 4. FIG. 1 is a three-dimensional schematic diagram of an installation base according to an embodiment. An installation base 100 includes a main body 110 and a release member 130. FIG. 2 shows an exploded diagram of an installation base according to an embodiment. FIG. 3 shows schematic diagram of the left of an installation base according to an embodiment. FIG. 4 shows a schematic diagram of an operation of an installation base according to an embodiment. FIG. 5 shows a schematic diagram of assembly of a wearable device according to an embodiment. Referring to FIG. 2 as well as FIG. 1, the main body 110 includes a first surface 111 and a second surface 112 on two opposite sides. The first surface 111 is provided with a magnet piece 114. More specifically, the magnet piece 114 may be a magnet piece 114 visibly arranged on the first surface 111, or may be a magnet piece 114 arranged at an interior near the first surface 111. The magnet piece 114 has a sufficient magnetic force such that the installation base 100 can be attracted to other components from the side of the first surface 111 by the magnet piece 114. In this embodiment, the installation base 100 may be used for assembling with various commercial wearable products, for example, smart wearable devices, police secret recorders, bicycle lighting lamps and military equipment. Moreover, a function of being able to be combined with or separated from a platform or structure to be assembled with can be achieved by the magnetic force of the magnet piece 114. As shown in FIG. 3 to FIG. 5, more specifically, taking a police secret recorder as an example of a wearable device 200, the wearable device 200 is assembled on the installation base 100. The installation base 100 attaches a carrier platform 300 to the first surface 111 of the main body 110 by the magnet piece 114. The carrier platform 300 may be, for example, a plate-like object made of a metal material. The structure of installation base 100 for coordinating with the carrier platform 300 so as to be attached to a user's body is to be described in detail below. In this embodiment, the material of the main body 110 is, for example but not limited to, plastic. In this embodiment, the magnet piece 114 is arranged on two lateral sides of the first surface 111.

As shown in FIG. 2, the release member 130 is arranged on the second surface 112 of the main body 110. The release member 130 includes a pressing part 131, a pivoting part 132 and an operating part 133. The pivoting part 132 is pivotally connected to the main body 110 in a first direction X. The pressing part 131 extends from the pivoting part 132 in a second direction Y and protrudes from the main body 110, and a length L of the pressing part 131 in the second direction Y is greater than a thickness T from the first surface 111 to the second surface 112 of the main body 110. The second direction Y is perpendicular to the first direction X, and the operating part 133 extends from the pivoting part 132 in the second direction Y toward a direction opposite to the pressing part 131. Referring to FIG. 2 as well as FIG. 3 and FIG. 4, in this embodiment, the release member 130 may be pivotally turned around the pivoting part 132 as the axis in the first direction X. When the release part 130 is pivotally turned, since the pressing part 131 protrudes from the main body 110 and its length L is greater than the thickness T of the main body 110, as shown in FIG. 4, the pressing part 131 can press against the carrier platform 300 attached to the first surface 111, and separate the carrier platform 300 from the first surface 111. In this embodiment, the material of the release member 130 is, for example but not limited to, plastic.

More specifically, when the carrier platform 300 and the installation base 100 are attracted to each other, a user may lift the operating part 133 to pivotally turn the release member 130 to press the pressing part 131 of the release member 130 against the carrier platform 300, such that a gap is produced between the carrier platform 300 and the first surface 111, thus reducing the force of attraction of the magnet piece 114 upon the carrier platform 300 and allowing the user to easily remove the installation base 100. Even if the installation base 100 is provided with a magnet having a larger force of attraction, a user may also separate the carrier platform 300 from the installation base 100 by a minimal effort with assistance of the releasing member 130, thus preventing any issue of removal difficulties of the installation base 100 caused by an excessive force of attraction of a magnet.

As shown in FIG. 3 and FIG. 4, in this embodiment, an end part 1311 of the pressing part 131 is away from the pivoting part 132, and the end part 1311 is shaped as a rounded angle or a sharp angle. More specifically, as shown in FIG. 4, taking a rounded angle for example, when a user pivotally turns the release member 130 by the operating part 133, the rounded angle at the end part 1311 of the pressing part 131 is capable of effectively pushing the carrier platform 300 to separate the carrier platform 300 from the installation base 100, and the configuration of the rounded angle can also reduce damage (for example, scratches) generated while the pressing part 131 presses against the carrier platform 300.

As shown in FIG. 3 and FIG. 4, in this embodiment, a portion from the pivoting part 132 to the end part 1311 is defined as a first section L1, and a portion from the pivoting part 132 to the operating part 133 is defined as a second section L2, and a length of the second section L2 is greater than or equal to a length of the first section L1. More specifically, using the pivoting part 132 as a fulcrum and the configuration of the section L2 being greater than or equal to the first section L1, a user is enabled to lift the operating part 133 with minimal effort, and because of the lever of force, that is, the second section L2 is longer, the pressing part 131 is capable of pressing the carrier platform 300 and easily separating the carrier platform 300 from the installation base 100.

Refer to FIG. 5 as well as FIG. 2. In this embodiment, the main body 110 further includes a fastening member 115 arranged on the second surface 112 of the main body 110. The material of the fastening member 115 may be, for example but not limited to, plastic. For example, in this embodiment, the fastener member 115 is made of a plastic material and is integrally formed by injection molding, and is shaped as a rectangle or may be in a geometric design corresponding to the structure to be assembled with. In other implementation forms, the fastener member 115 may be formed by joining a plurality of plastic plates made in advance. In other implementation forms, the fastening member 115 may be shaped as a circle or a polygon such as a triangle or a pentagon. In this embodiment, the fastening member 115 is a connecting member in form of a receptacle, and the fastening member 115 further includes a fastening groove 1151. The fastening member 115 may coordinate with another type of connecting member in form of a plug, so as to fasten the wearable device 200 on the installation base 100. More specifically, the another type of connecting member in form of a plug may be arranged on the wearable device 200, so that the wearable device 200 in form of a plug may be fastened onto the fastening member 115 in form of a receptacle. In other implementation forms, the fastening member 115 may also serve as a connecting member in form of a plug, and be used in conjunction with another type of connecting member in form of a receptacle.

As shown in FIG. 2 and FIG. 5, in this embodiment, the release member 130 is provided with an opening 135 corresponding in position to the fastening member 115, and the fastening member 115 of the main body 110 is exposed from the opening 135. More specifically, the fastening member 115 protrudes from the side of the second surface 112 so that the side of the first surface 111 of the installation base 100 is used for attracting the carrier platform 300, and the side of the second surface 112 may be used for fastening the wearable device 200; that is, a user is allowed to easily secure the wearable device 200 onto his/her body by the fastening member 115. When a user wishes to remove the wearable device 200, the wearable device 200 can be easily removed from the fastening member 115. Next, to remove the installation base 100, the installation base 100 and the carrier platform 300 can be easily separated by the release member 130.

Again referring to FIG. 3 and FIG. 4, as previously described, in this embodiment, the installation base 100 further includes the carrier platform 300, and the carrier platform 300 is attached to the first surface 111 by the magnet piece 114. More specifically, the carrier platform 300 and the installation base 100 may be respectively located on an inner side and an outer side of a garment worn by a user. As shown in FIG. 3 and FIG. 4, the dotted lines represent the garment, the carrier platform 300 is on the left of the dotted lines, that is, the inner side of the garment worn, and the installation base 100 is located on the right of the dotted lines, that is, the outer side of the garment worn. Using the magnetic force of the magnet piece 114 of the installation base 100, the carrier platform 300 may be attached to the first surface 111 of the installation base 100 while being interposed by the garment, so as to secure the installation base 100 onto the body of a user. When a user wishes to remove the installation base 100, the release member 130 can be operated to press the carrier platform 300 on the inner side of the garment with the interposition of the garment, so as to separate the carrier platform 300 from the installation base 100.

As shown in FIG. 4, in this embodiment, when the release member 130 is pivotally turned, the pressing part 131 presses against the carrier platform 300, such that a gap H is produced between the main body 110 and the carrier platform 300. More specifically, when the pressing part 131 presses against the carrier platform 300 such that the carrier platform 300 and the first surface 111 of the main body 110 are separated to produce the gap H, as the gap H increases, the force of attraction of the magnet piece 114 on the first surface 111 upon the carrier platform 300 becomes smaller. As the force of attraction of the magnet piece 114 becomes weak enough, a user can then easily separate the carrier platform 300 from the installation base 100. Moreover, when the release member 130 is pivotally turned, an included angle C is formed between the main body 110 and the carrier platform 300. As the included angle C increases, the force of attraction of the magnet piece 114 upon the carrier platform 300 also becomes smaller.

Figure 6:
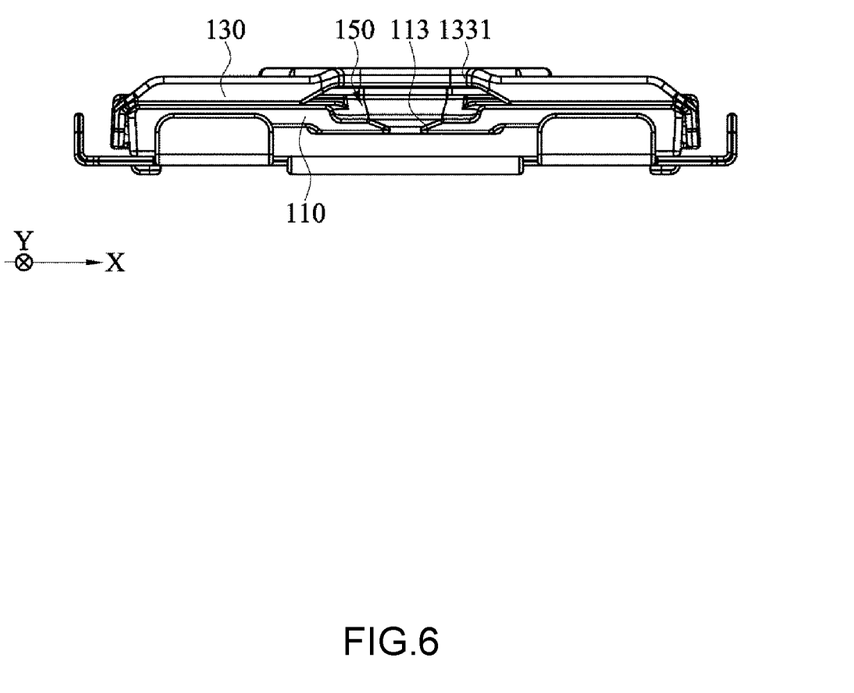
FIG. 6 is a schematic diagram of an installation base viewed from another angle according to an embodiment.

Refer to FIG. 6 as well as FIG. 1 and FIG. 2. FIG. 6 shows a schematic diagram of an installation base viewed from the bottom according to an embodiment. In this embodiment, the operating part 133 further has an accommodating portion 1331 to form a finger receiving space 150 for operation by a user's finger. In addition, the main body 110 further has an accommodating chamber 113 corresponding in position to the accommodating portion 1331, in a way that the accommodating chamber 113 and the accommodating portion 1331 jointly form the finger receiving space 150, providing a user with more operating space. In other implementation forms, only the accommodating portion 1331 of the operating part 133 may be provided as the finger receiving space 150 for operation of a user.

In conclusion, the installation base 100 is provided according to an embodiment. When the carrier platform 300 is attached to the first surface 111 by the installation base 100, a user may lift the operating part 133 to pivotally turn the release member 130 to press the pressing part 131 of the release member 130 against the carrier platform 300, such that a gap is produced between the carrier platform 300 and the first surface 111, thus reducing the force of attraction of the magnet piece 114 upon the carrier platform 300 and allowing the user to easily remove the installation base 100. Even if the installation base 100 is provided with a magnet having a larger force of attraction, the user may also separate the carrier platform 300 from the installation base 100 by a minimal effort with assistance of the releasing member 130, thus preventing any issue of removal difficulties of the installation base 100 caused by an excessive force of attraction of a magnet.

What is claimed is:

1. An installation base, comprising:
a main body, comprising a first surface and a second surface on two opposite sides, the first surface being provided with a magnet piece; and
a release member, arranged on the second surface of the main body, the release member comprising a pressing part, a pivoting part and an operating part, the pivoting part pivotally connected to the main body in a first direction, the pressing part extending from the pivoting part in a second direction and protruding from the main body, a length of the pressing part in the second direction being greater than a thickness from the first surface to the second surface of the main body, wherein the second direction is perpendicular to the first direction, and the operating part extends from the pivoting part in the second direction toward a direction opposite to the pressing part;
wherein the release member is configured to pivotally turn around the pivoting part along an axis in the first direction.

2. The installation base according to claim 1, wherein an end part of the pressing part is away from the pivoting part, and the end part is shaped as a rounded angle or a sharp angle.

3. The installation base according to claim 2, wherein a portion from the pivoting part to the end part is defined as a first section, and a portion from the pivoting part to the operating part is defined as a second section, and a length of the second section is greater than or equal to a length of the first section.

4. The installation base according to claim 1, wherein the main body further comprises a fastening member arranged on the second surface of the main body.

5. The installation base according to claim 4, wherein the release member is provided with an opening corresponding in position to the fastening member, and the fastening member of the main body is exposed from the opening.

6. The installation base according to claim 1, further comprising: a carrier platform, the carrier platform being attached to the first surface by the magnet piece.

7. The installation base according to claim 6, wherein when the release member is pivotally turned, the pressing part presses against the carrier platform, such that a gap is produced between the main body and the carrier platform.

8. The installation base according to claim 6, wherein when the release member is pivotally turned, an included angle is formed between the main body and the carrier platform.

9. The installation base according to claim 1, wherein the magnet piece is arranged on two lateral sides of the first surface.

10. The installation base according to claim 1, wherein the operating part has an accommodating portion.

11. The installation base according to claim 10, wherein the body has an accommodating chamber corresponding in position to the accommodating portion.

12. An installation base, comprising:
a main body, comprising a first surface and a second surface on two opposite sides, the first surface being provided with a magnet piece; and
a release member, arranged on the second surface of the main body, the release member comprising a pressing part, a pivoting part and an operating part, the pivoting part pivotally connected to the main body in a first direction, the pressing part extending from the pivoting part in a second direction and protruding from the main body, a length of the pressing part in the second direction being greater than a thickness from the first surface to the second surface of the main body, wherein the second direction is perpendicular to the first direction, and the operating part extends from the pivoting part in the second direction toward a direction opposite to the pressing part;

wherein an end part of the pressing part is away from the pivoting part, and the end part is shaped as a rounded angle or a sharp angle;

wherein a portion from the pivoting part to the end part is defined as a first section, a portion from the pivoting part to the operating part is defined as a second section, and a length of the second section is greater than or equal to a length of the first section.

13. The installation base according to claim 12, wherein the main body further comprises a fastening member arranged on the second surface of the main body.

14. The installation base according to claim 13, wherein the release member is provided with an opening corresponding in position to the fastening member, and the fastening member of the main body is exposed from the opening.

15. The installation base according to claim 12, further comprising: a carrier platform, the carrier platform being attached to the first surface by the magnet piece.

16. The installation base according to claim 15, wherein when the release member is pivotally turned, the pressing part presses against the carrier platform, such that a gap is produced between the main body and the carrier platform.

17. The installation base according to claim 15, wherein when the release member is pivotally turned, an included angle is formed between the main body and the carrier platform.

18. The installation base according to claim 12, wherein the magnet piece is arranged on two lateral sides of the first surface.

19. The installation base according to claim 12, wherein the operating part has an accommodating portion.

20. The installation base according to claim 19, wherein the body has an accommodating chamber corresponding in position to the accommodating portion.

* * * * *